Nov. 11, 1930. J. B. KESSEL Re. 17,869

MIXING DEVICE FOR CARBURETORS

Original Filed May 2, 1925

Inventor
Johannes B. Kessel
By [illegible]
Atty.

Reissued Nov. 11, 1930

Re. 17,869

UNITED STATES PATENT OFFICE

JOHANNES B. KESSEL, OF CHICAGO, ILLINOIS

MIXING DEVICE FOR CARBURETORS

Original application filed May 2, 1925, Serial No. 27,382. Patent No. 1,636,187, dated July 19, 1927. Divided and application filed November 1, 1926, Serial No. 145,393, now Patent No. 1,717,509, dated June 18, 1929. Application for reissue filed May 21, 1930. Serial No. 454,466.

This application is a division of my original application, Serial Number 27,382, filed May 2, 1925, Patent Number 1,636,187, dated July 19, 1927.

This invention relates to improvements in mixing devices, particularly adapted though not necessarily limited in its use, in connection with carburetors, and one of the objects of the same is to provide improved means whereby there will be a thorough mixing of the air and fuel, and at the same time the cylinder of the engine will be supplied with what is known as a dry mixture, with the result that there will be produced a maximum amount of power with a minimum consumption of fuel.

A further object is to provide improved means whereby the supply of fuel will be automatically controlled by the suction created in the engine cylinder.

To the attainment of these ends and the accomplishment of other new and useful objects as will apear, the invention consists in the features of novelty in substantially the construction, combination and arrangement of the several parts hereinafter more fully described and claimed and shown in the accompanying drawing illustrating this invention and in which Figure 1 is a vertical sectional view of a carburetor of this character constructed in accordance with the principles of this invention.

Figure 1:
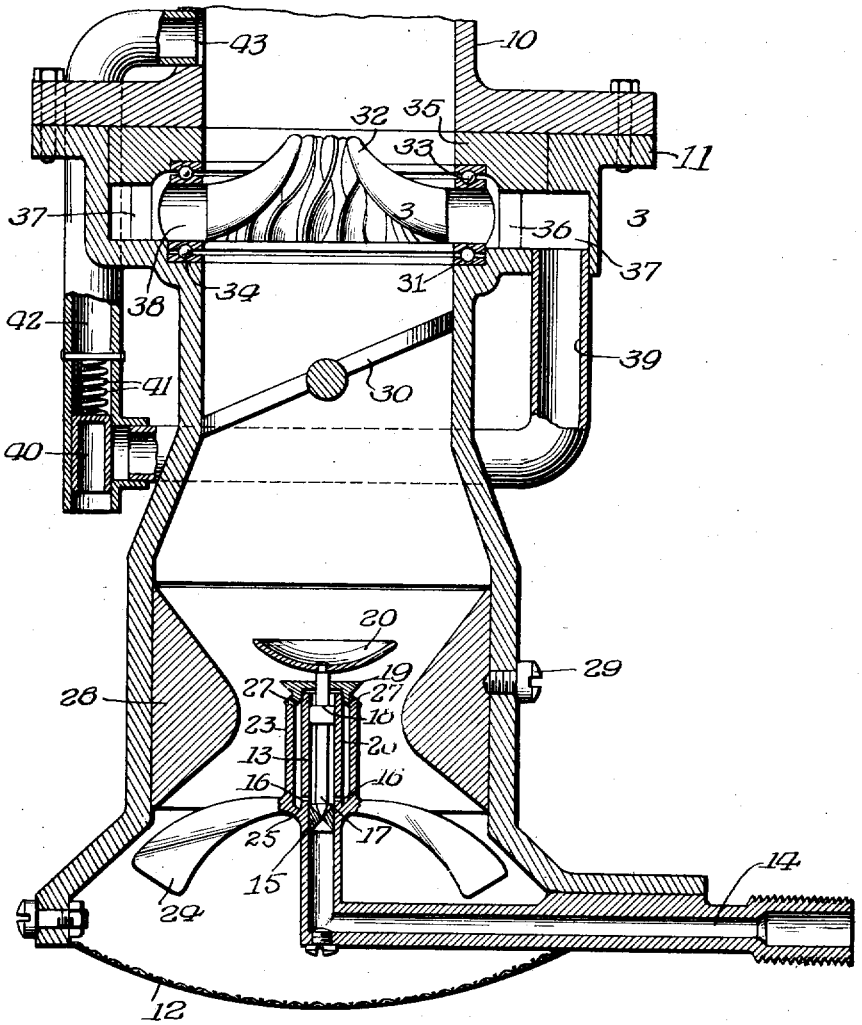

Referring more particularly to the drawing the numeral 10 designates generally a mixing chamber in which the fuel and air are mixed and is supported in the usual manner by means of a flange 11.

The bottom of the mixing chamber is open and extending thereacross is a screen 12 to permit the air to enter the mixing chamber and to exclude foreign particles. Discharging into the mixing chamber is a needle valve casing 13 which receives its supply of fuel from any suitable source through a pipe 14 supported in any suitable manner. Arranged within the casing 13 is an adjustable valve seat 15 which is arranged adjacent suitable outlet openings 16 in the casing wall and through which outlets the fuel flows after passing the valve seat 15.

A needle valve 17 co-operates with the valve seat 15 and the valve is guided in its movement preferably by means of an enlargement or collar 18 carried by the valve and engaging the wall of the casing 13 above the valve seat. The collar also serves as a means for limiting the movement of the valve in one direction.

A cap 19 is removably secured to the top of the casing 13 and through which cap the stem of the valve passes to be guided thereby.

Connected with the upper end of the valve stem is a disc like element 20 preferably of a concave shape and is of a suitable diameter that when the throttle valve 30 is opened and suction in the engine cylinder is manifested in the mixing chamber, the suction will operate upon the element 20 to raise or unseat the valve 17 from the seat 15 and thereby permit the fuel to flow out of the openings 16 in the valve casing.

A plug 22 may be provided and is removably seated in an opening in the pipe 14 in alinement with the valve seat 15 so that by removing the plug the valve seat may be adjusted as desired.

Encompassing the casing 13 is the hub 23 of a spinner member, which latter is provided with any suitable number of wings or blades 24. One end of the hub rests upon a bearing 25 which encompasses the valve casing 13 and is supported thereby below the openings 16. The other end of the hub has a bearing against the cap 19.

The internal diameter of the hub 23 is somewhat larger than the external diameter of the adjacent portion of the valve casing 13 so as to form a chamber 26 therebetween and with which chamber the openings 16 have communication so that the fuel flowing from the openings 16 will enter the chamber 26 in the hub 23 of the spinner, and will be delivered therefrom through openings 27 as the spinner and hub rotate and which openings are located preferably adjacent one end of the hub.

The cap 19 is preferably of a diameter somewhat larger than the end of the hub and assists in directing the stream of fuel which is being emitted through the openings 27, and the diameter of the disc like element 20 is also such that the fuel will impinge the face thereof.

Arranged within the mixing chamber and encompassing the discharge outlets of the needle valve casing and the spinner 23—24, is a Venturi tube 28 which may be adjustably secured in position by means of a fastening device 29, such as a screw or the like, and the venturi is located adjacent the point where the incoming air and the fuel first contact.

A throttle valve 30 may be provided for controlling the flow of the mixture through the mixing chamber, and on one side of which valve the spinner and the needle valve is located.

The above referred to parts constitute the subject matter of my original application above referred to.

Disposed on the opposite side of the valve 30 is a rotor device designated generally by the reference numeral 31 which may be of any desired configuration but preferably embodies an annular member having a plurality of blades or wings 32, any number of which may be provided, extending from the inner periphery of the member towards the diametric center thereof. These wings 32 are preferably inclined upwardly and are slightly twisted so as to give a spiral formation to the blades.

Figure 3:
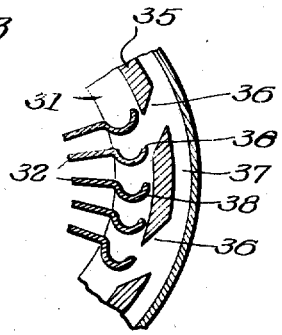
Figure 3 is a detail sectional view as taken on line 3—3, Figure 1.
Figure 2:
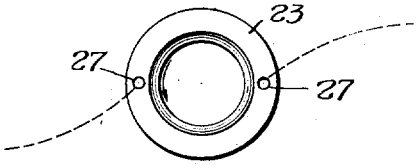
Figure 2 is an enlarged top plan view of one of the spinners, with parts omitted.

The rotor 31 is preferably provided with ball bearings 33 supported by shoulder 34 formed in the wall of the mixing chamber and a bearing member 35. This member 35 (see particularly Figure 3) is provided with openings 36 extending therethrough and arranged at a tangent to the periphery of the rotor. A chamber 37 is provided adjacent the openings 36 so that air which is supplied to the chamber 37 will be directed through the openings 36 of the rotor 35 to impinge buckets or blades 38 which are carried by the periphery of the rotor 31. The openings 36 will serve as an injector for directing the air against the blades 38 to rotate the rotor.

Any number of blades 38 may be provided as well as any number of openings 36.

Communicating with the chamber 37 is an air supply pipe 39 the inlet end of which is controlled by a valve 40, the latter being normally held in a position to close the inlet opening preferably by means of a spring 41. A pipe 42 has communication with the valve chamber and also has communication as at 43 with the mixing chamber 10 preferably above the rotor 31, so that the suction created in the engine will be manifested upon the valve 40 through the pipe 42 to actuate the valve to open the inlet pipe 39 and thereby permit air to flow into the chamber 37 to be discharged through the openings 36 against the blades 38 of the rotor 31.

This flow of air is augmented by the engine suction and the engine suction will also operate to rotate the rotor 31.

With this improved construction it will be seen that there is provided a gas and air mixing device located on opposite sides of the throttle valve 30, with the result that the incoming air and gas will first be thoroughly mixed at the point where the gas leaves the supply nozzle. When the throttle valve 30 is opened to allow the mixture to pass it will come in contact with the rotor 31 and at the same time an additional supply of air will be mixed with the mixture, the rotor 31 serving as an additional means for breaking up all of the particles of gas to produce a thorough mixture. Obviously the rotor 31 may be located on either side of the throttle valve 30.

It is thought that the operation will be clearly understood from the foregoing but briefly stated it is as follows. Assuming the valve 17 to be seated, the suction created in the engine cylinder will, when the throttle valve 30 is opened, be manifested in the mixing chamber and will operate upon the disc 20 carried by the needle valve 17 to raise the valve and will allow the fuel to flow through the pipe 14, into the needle valve casing, out of the openings 16 and into the chamber 26 in the spinner, suction also tending to draw the fuel through the openings 27 in the spinner.

The suction will also be manifested upon the blades 24 of the spinner and will cause the same to rotate as the air is drawn in through the screen 12. As the air passes through the venturi 28 it contacts with the fuel being delivered through the openings 27 in the spinner. The operation of the spinner will cause a rotary or swirling movement to be given to the air and also to the fuel, with the result that there will be a thorough mixture or commingling of the air and fuel in the mixing chamber.

When the mixture passes the throttle valve 30 it will come into contact with the rotor 31 and additional air which is being drawn through the pipe 39 into the chamber 37 will be delivered to the mixture in the mixing chamber and will, through the medium of the rotor 31, be thoroughly mixed with the mixture, the rotor 31 operating to break up all of the particles of gas, resulting in a thorough mixture.

It will be manifest that the operation of the rotor and the spinner as well as the operation of the needle valve and the valve 40 will be controlled by suction created in the engine cylinder.

While the preferred form of the invention has been herein shown and described it is to be understood that various changes may be made in the details of construction and in the combination and arrangement of the several parts, within the scope of the claims, without departing from the spirit of this invention.

What is claimed as new is:—

1. A mixing device adapted to be located beyond the throttle valve of a carburetor, including a rotor, an air passage for directing air against the rotor for assisting in rotating it, a valve for controlling the said air passage, and means whereby the valve will be responsive in its operation to engine suction, said rotor embodying an annular member and a plurality of blades extending from the inner periphery of the member toward the diametric center thereof having their inner ends free and inclining upwardly.

2. A mixing device adapted to be located beyond the throttle valve of a carburetor, including a rotor, an air passage for directing air against the rotor for assisting in rotating it, a valve for controlling the said air passage, and means whereby the valve will be responsive in its operation to engine suction, said rotor embodying an annular member and a plurality of blades extending from the inner periphery of the member toward the diametric center thereof having their inner ends free and inclining upwardly, said blades being twisted lengthwise of the axes thereof to give a spiral formation to the blades.

3. A mixing device adapted to be located beyond the throttle valve of a carburetor, including a rotor, an air passage for directing air against the rotor for assisting in rotating it, a valve for controlling the air passage, said rotor embodying an annular member, a plurality of blades extending from the inner periphery of the member toward the diametric center thereof having their inner ends free and inclining upwardly, and a stationary annular member encompassing the rotor, the last recital annular member having openings therethrough and arranged at a tangent to the periphery of the rotor.

4. A mixing device adapted to be located beyond the throttle valve of a carburetor, including a rotor, an air passage for directing air against the rotor for assisting in rotating it, a valve for controlling the air passage, said rotor embodying an annular member, a plurality of blades extending from the inner periphery of the member toward the diametric center thereof having their inner ends free and inclining upwardly, blades carried by and projecting beyond the periphery of the rotor, and a stationary annular member encompassing the rotor and the last recited blades and having openings therethrough arranged at a tangent to the periphery of the rotor.

5. A mixing device adapted to be located on one side of the throttle valve of a carburetor, including a rotor, said rotor having propeller portions and mixing portions, an air passage for directing air against the said propeller portions for assisting in rotating the propeller and the said mixing portions, and a valve for controlling the supply of air to said passage, said passage having communication with the mixing chamber, whereby suction created in the said chamber will actuate said valve to open said air inlet.

6. A mixing device adapted to be located on one side of the throttle valve of a carburetor, including a rotor, said rotor having propeller portions and mixing portions, a casing for the rotor, said casing having an annular passage encompassing said propeller portions and having outlet openings to direct air against the propeller blades to assist in rotating the rotor, an air inlet passage communicating with said annular passage, and a valve for controlling the supply of air to said passage, the last said passage having communication with the mixing chamber whereby suction created in said chamber will actuate said valve to open said air inlet.

7. A mixing device located on one side of the throttle valve of a carburetor, including a rotor, said rotor having mixing portions at the central portion thereof and propeller blades at the periphery thereof and encircling the mixing blades, and an air passage for directing air against the propeller portions for assisting in rotating the propeller and said mixing portions, said passage having communication with the mixing chamber, whereby suction created in said chamber will cause air to be entrained through said passage and against the said propeller blades.

8. A mixing device located on one side of the throttle valve of a carburetor, including a rotor, said rotor comprising an annular body, a mixing blade disposed within and extending in a direction across the annular body, propeller portions connected with said annular body and encompassing said mixing blade, and an air passage for directing air against the propeller portions for rotating the rotor, said passage having communication with the mixing chamber whereby suction created in said chamber will cause air to be entrained through said passage and against the said propeller blades.

9. A mixing device located on one side of the throttle valve of a carburetor, including a rotor, said rotor comprising an annular body, a mixing blade disposed within and extending in a direction across the annular body, propeller portions connected with said annular body and encircling said mixing blade, an air passage for directing air against the propeller portions for rotating the rotor, said passage having communication with the mixing chamber whereby suction created in said chamber will cause air to be entrained through said passage and against the said propeller blades, and means for controlling said passage.

10. A mixing device located on one side of the throttle valve of a carburetor, including a rotor, said rotor embodying mixing blades at the central portion thereof, said blades arranged to form fuel passages through the rotor, said rotor also embodying propeller portions encircling the mixing blades, and an air passage, one end of the passage being adapted to be opened to the atmosphere, the other end of the passage being open to suction manifested in the carburetor and operating to direct against the said propeller blades, the air entrained into and through said passage by the said suction.

11. A mixing device located on one side of the throttle valve of a carburetor, including a rotor, said rotor embodying mixing blades at the central portion thereof, said blades arranged to form fuel passages through the rotor, said rotor also embodying propeller portions encircling the mixing blades, an air passage, one end of the passage being open to atmosphere, the other end of the passage being adapted to be opened to the suction manifested in the carburetor and operating to direct against the said propeller blades, the air entrained into and through said passage by the said suction, and means for controlling said passage.

In testimony whereof, I have signed my name to this specification, on this 13th day of May, A. D. 1930.

JOHANNES B. KESSEL.